Figure 1:
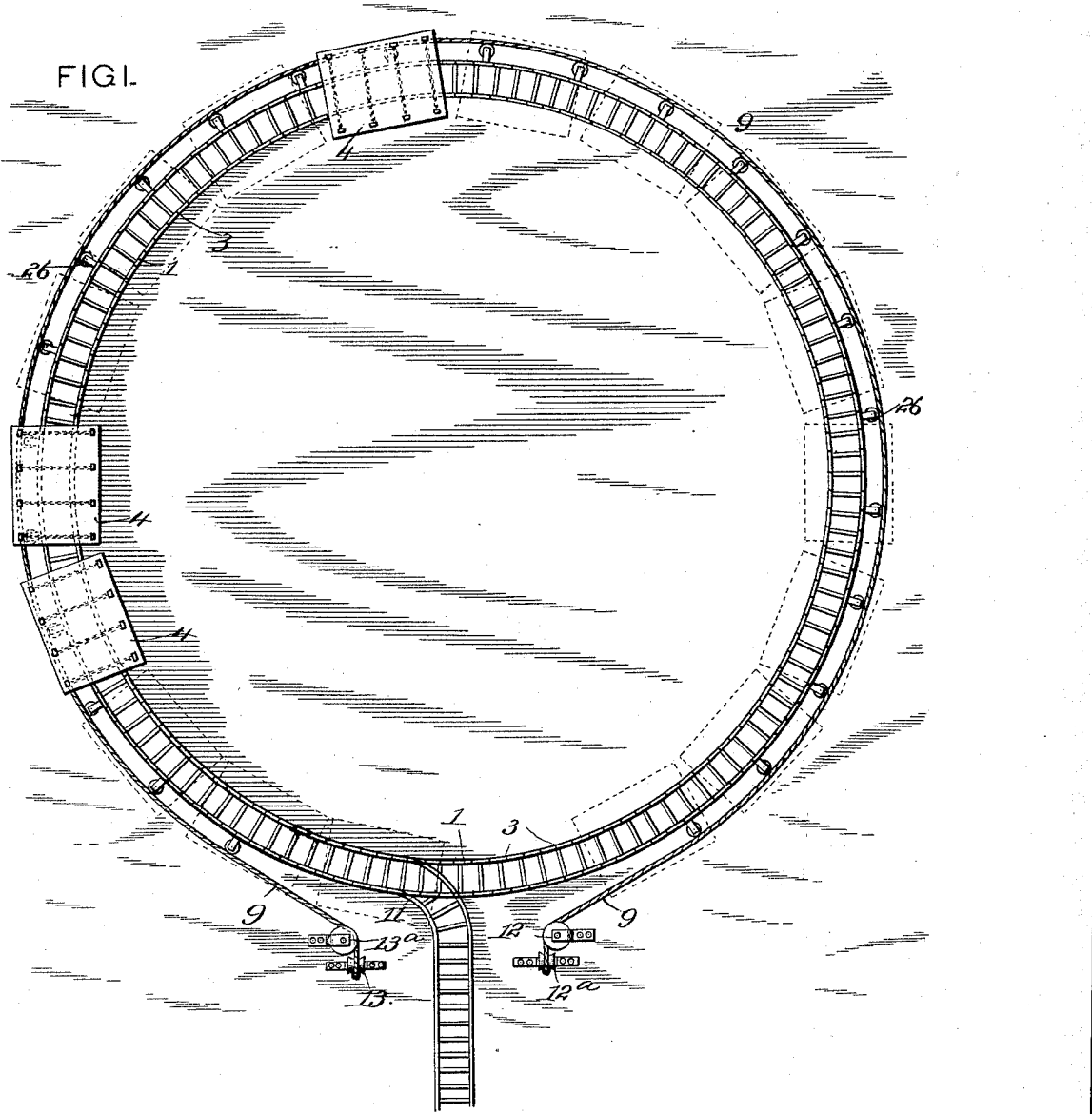

(No Model.)  6 Sheets—Sheet 1.
T. R. TIMBY.
PROCESS OF AND APPARATUS FOR AGING LIQUORS.

No. 485,999. Patented Nov. 8, 1892.

Witnesses:
Harry S. Rohrer.
George E. Cruse.

Inventor:
T. R. Timby
By Knight
Attorneys.

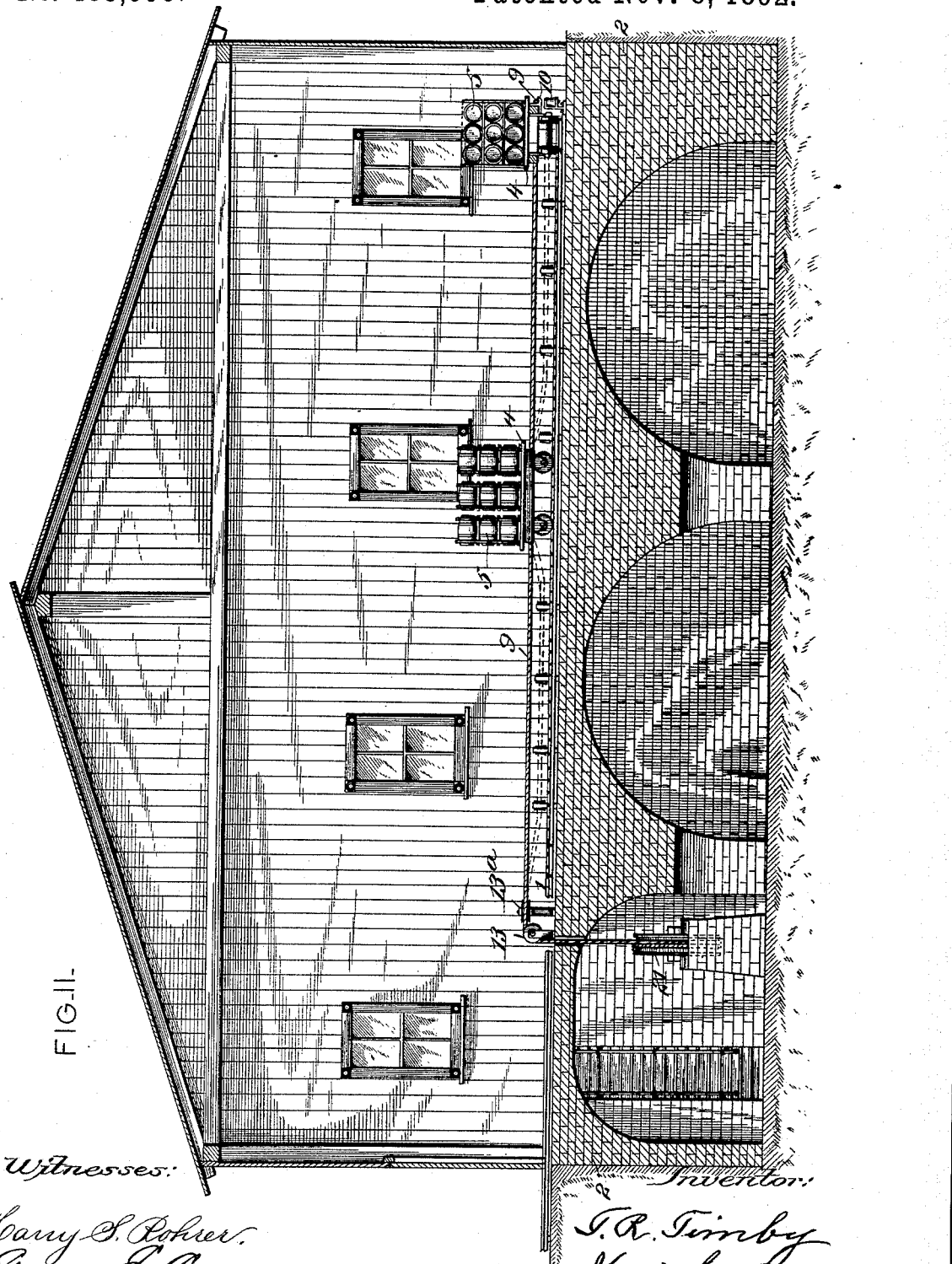

(No Model.) 6 Sheets—Sheet 3.
T. R. TIMBY.
PROCESS OF AND APPARATUS FOR AGING LIQUORS.
No. 485,999. Patented Nov. 8, 1892.
FIG. III.
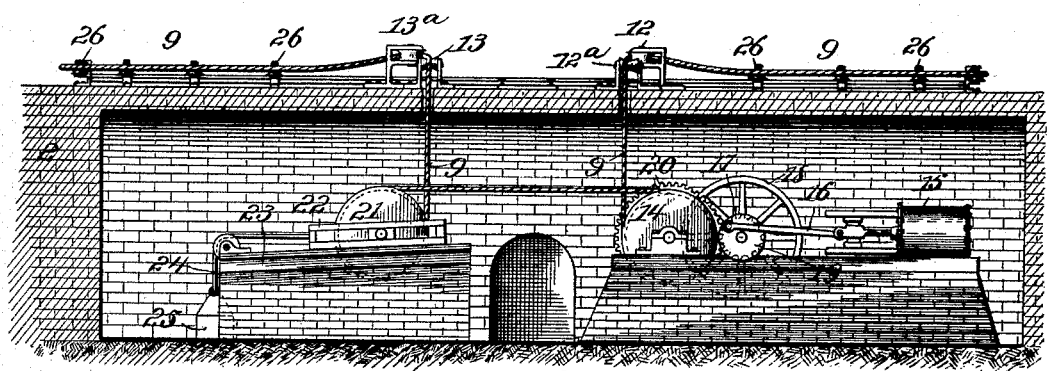
FIG. IV.
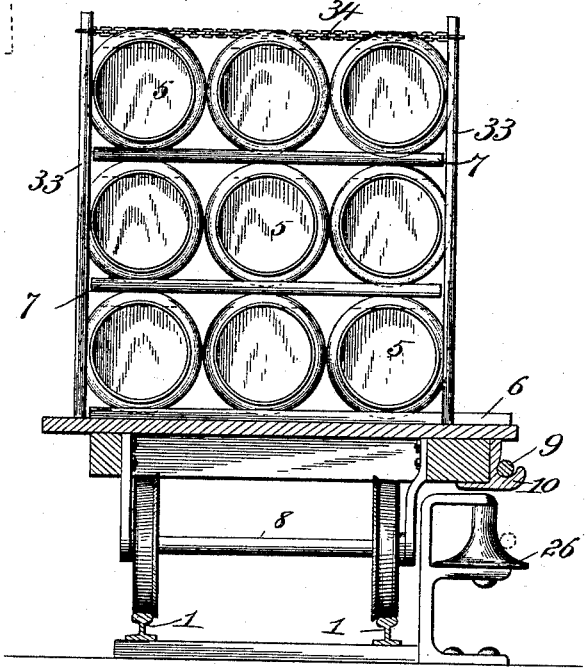
Witnesses:
Harry S. Rohrer
George E. Cruice
Inventor:
T. R. Timby
By Knight Bros
Attorneys (No Model.) 6 Sheets—Sheet 4.
T. R. TIMBY.
PROCESS OF AND APPARATUS FOR AGING LIQUORS.
No. 485,999. Patented Nov. 8, 1892.
FIG. V.
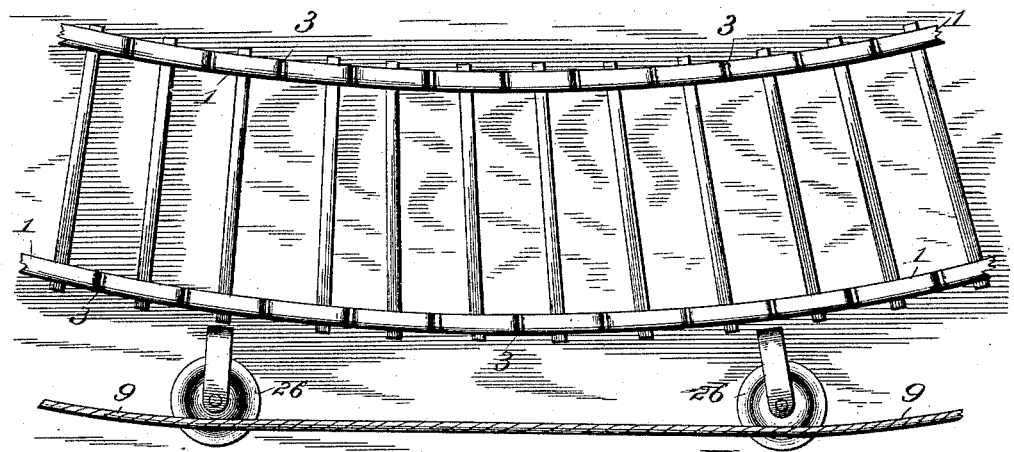
FIG. VI.
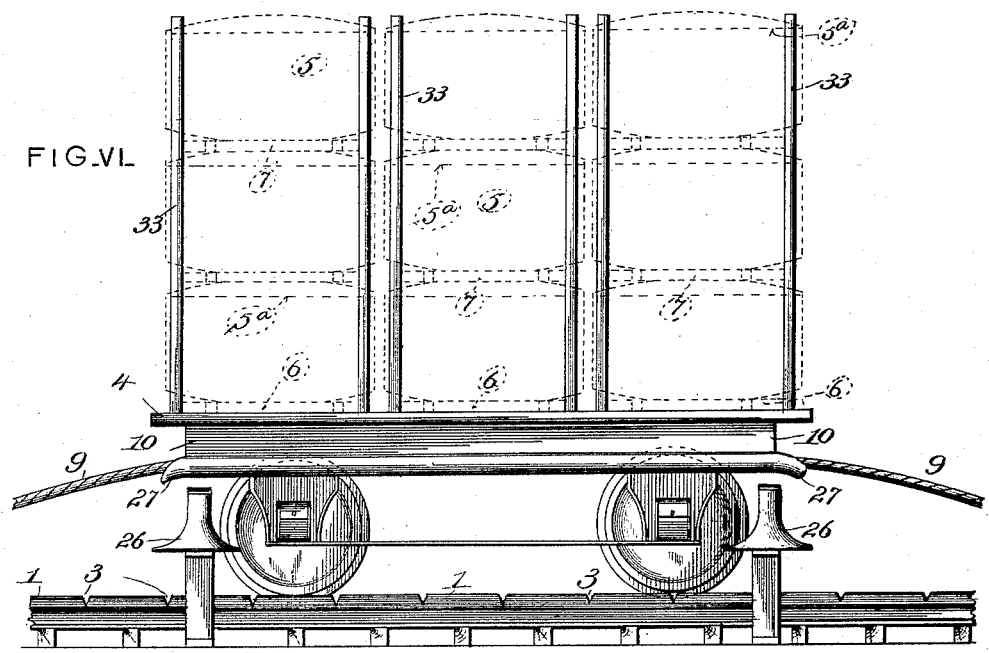

(No Model.) 6 Sheets—Sheet 5.
T. R. TIMBY.
PROCESS OF AND APPARATUS FOR AGING LIQUORS.
No. 485,999. Patented Nov. 8, 1892.
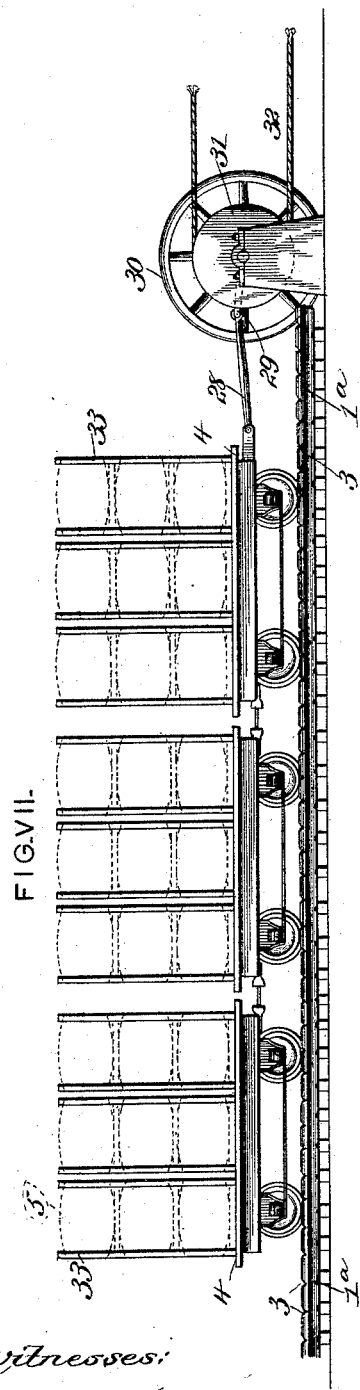
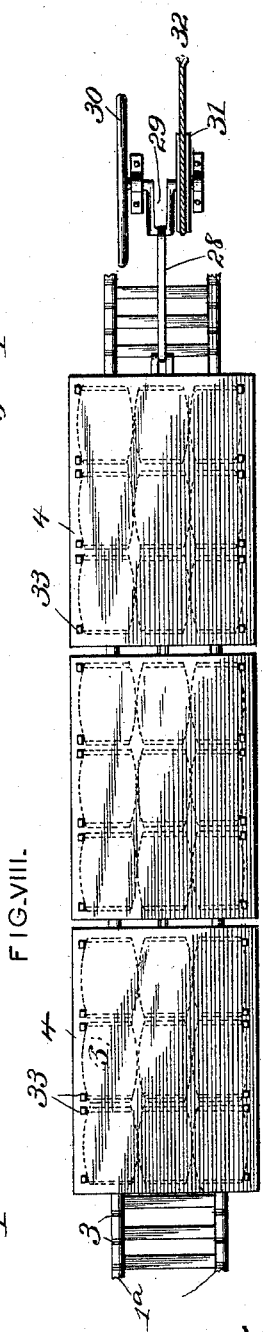
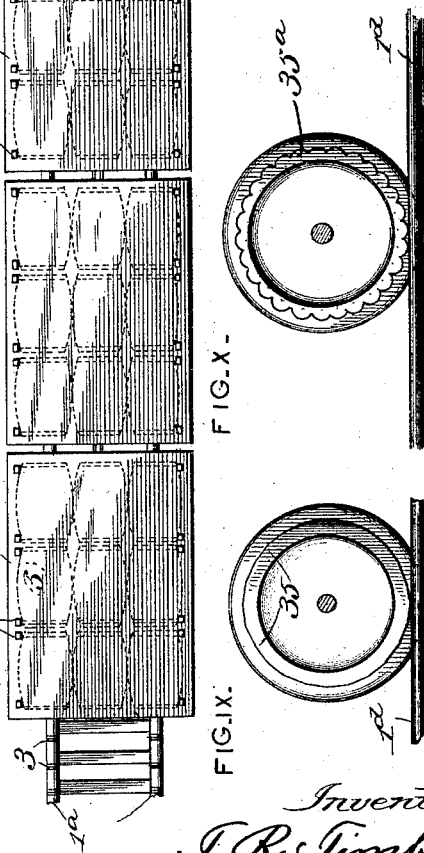

(No Model.)  
6 Sheets—Sheet 6.
T. R. TIMBY.
PROCESS OF AND APPARATUS FOR AGING LIQUORS.
No. 485,999.  
Patented Nov. 8, 1892.
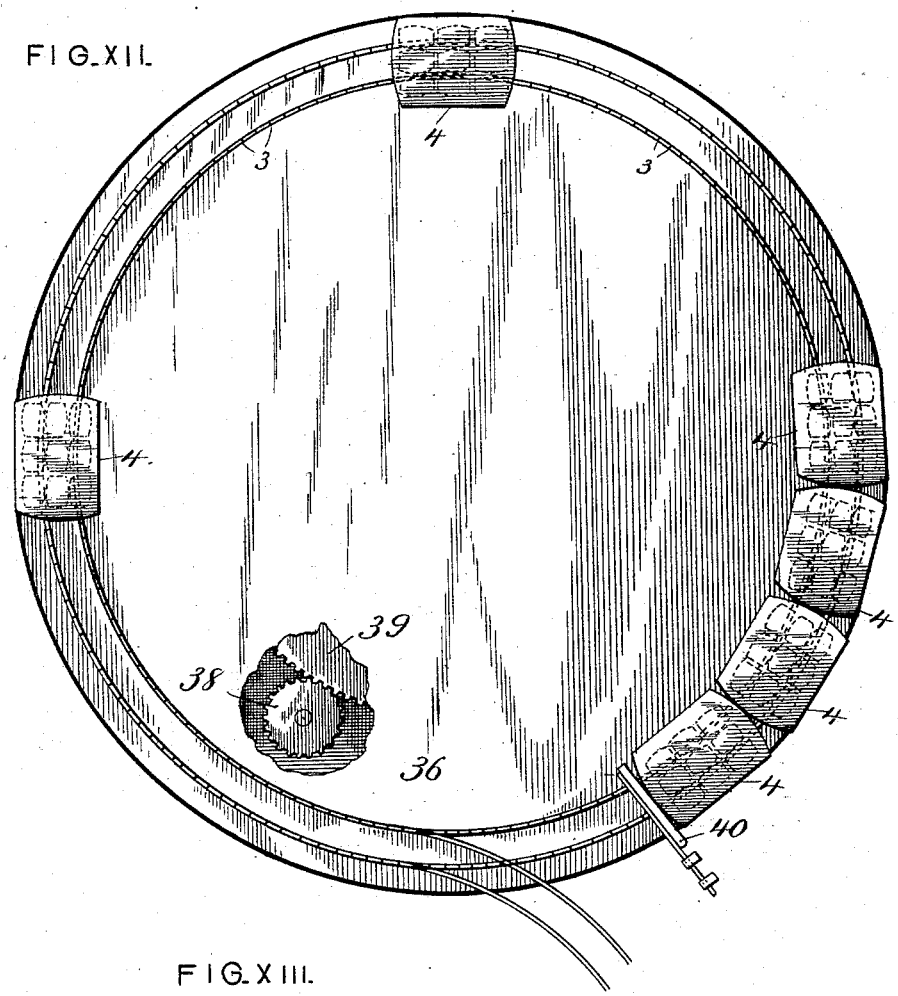
FIG. XII.
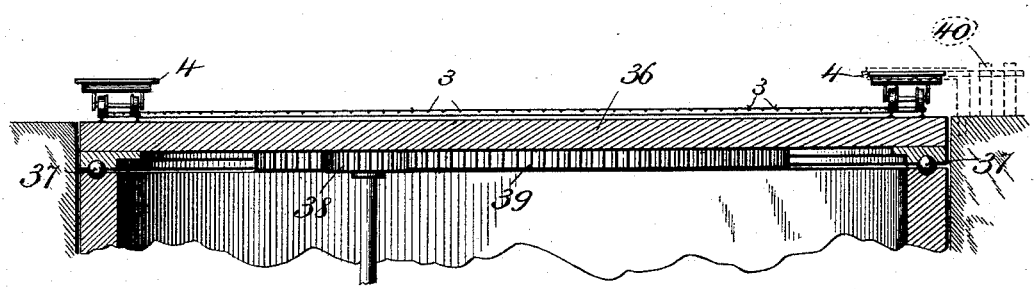
FIG. XIII.
Witnesses:  
Inventor:  
T. R. Timby  
By Knight Bros  
Attorneys.

UNITED STATES PATENT OFFICE.

THEODORE R. TIMBY, OF WASHINGTON, DISTRICT OF COLUMBIA.

PROCESS OF AND APPARATUS FOR AGING LIQUORS.

SPECIFICATION forming part of Letters Patent No. 485,999, dated November 8, 1892.

Application filed May 19, 1892. Serial No. 433,612. (No model.)

*To all whom it may concern:*

Be it known that I, THEODORE R. TIMBY, a citizen of the United States, residing at Washington, in the District of Columbia, have invented a new and useful Improvement in Processes of and Apparatus for Aging Liquors, of which the following is a specification.

In many of the modes heretofore devised for facilitating and expediting the ripening of liquors, so that the modified and improved condition which is spontaneously acquired with great age may be produced in a comparatively-brief period, various expedients have been devised by spraying, stirring, attrition, and other modes of violent mechanical action applied to the liquor itself and also by electrical action and by variations in temperature.

A leading object of agitating liquors for aging the same is to effect the more rapid oxidation of the fusel-oil. I have devised a method and apparatus by which a highly-effective form of agitation is produced by means involving but slight cost and adapted for wholesale operation.

My process consists in subjecting the liquor to sustained or continuous tremulous or rapid vibratory action by mechanical appliances without necessarily removing it from the casks or other packages in which it is contained in bulk.

The preferred mode of carrying my invention into effect consists in constructing a storehouse of suitable dimensions with an endless railway-track of notched, recessed, or disconnected rails and storing the liquor in ordinary casks upon springless trucks, which are continuously moved over such recessed tracks by means of a stationary engine and an endless cable. The effect may be produced on a straight track on which the cars move back and forth, or by tracks of other form, or by a turn-table or other track moved beneath stationary trucks on which the barrels of liquor are stored. The jarring tremulous motion may, if preferred, be produced by means of cars having wheels with notched, recessed, or angular treads passing over a smooth track. It will thus be understood that I carry out my invention by means of a railway-track and trucks mounted thereon, the surfaces of the truck-wheels and track being made relatively uneven either by constructing the track with an uneven recessed or broken surface or by making the truck-wheels with recessed angular or otherwise uneven treads. The relative horizontal movement between the cars and track may be produced by propelling the cars on the track or propelling the track beneath the cars, or both.

My invention is distinguished from earlier processes for accelerating the aging of liquors by mechanical means in the rapid tremulous character of the vibrations which are diffused throughout the body of the liquor and appear to have the effect of causing a much more rapid solution or permeation of the air to which the surface of the liquor is exposed, which results in bringing the oxygen into more rapid and thorough contact with all parts of the liquor. The rapidity of the vibrations may be from two hundred to three thousand per minute, and should be at least six hundred per minute, which is the effect produced by the passage of the two pairs of wheels of a four-wheeled truck moving at four miles an hour over a track with notches or indentations one foot apart.

In order that my invention may be fully understood, I will describe it in detail with reference to the accompanying drawings, which show suitable appliances for carrying it into effect, and in which—

Figure I is a plan view of the apparatus in its preferred form. Fig. II is an elevation of the same. Fig. III is an elevation from a point of view at right angles to that in Fig. II. Fig. IV is a transverse section on a larger scale, showing one of the loaded trucks on the track. Fig. V is a plan, on a larger scale, of a portion of the notched or recessed track and driving-cable. Fig. VI is an elevation of the same with one of the loaded cars. Fig. VII is an elevation of an apparatus of modified construction for carrying the invention into effect. Fig. VIII is a plan of the same. Fig. IX is a side elevation of an angular tread-wheel, which may be used on a smooth track. Fig. X is a side elevation of a corrugated wheel for the same purpose. Fig. XI is an edge view of the same. Fig. XII is a plan view illustrating another modification, consisting of a revolving track for carrying the invention into effect. Fig. XIII is a vertical section of the same.

In carrying out my invention I prefer to employ a railway 1, supported on a solid bed and foundation 2, the rails having transverse notches or recesses 3 at suitable intervals—say from one to two feet apart, more or less—which will serve to impart a jarring vibratory or tremulous motion to the trucks 4, running on the said rails, and thereby to the wine, spirits, or other liquor contained in casks or barrels 5, or containing-vessels of any sort, which may be loaded on the said trucks 4 in any suitable manner. For the purpose of illustration I have shown the trucks or cars 4 provided with skids or cradles 6, such as are commonly used for moving and storing barrels, and additional movable skids or cradles 7, placed on one tier of barrels for the reception of a superposed tier, so that several tiers of barrels may be loaded on the trucks or cars one above another.

The railway may be variously arranged. In Figs. I, II, and III, I have shown a circular track 1, with trucks 4 adapted thereto, the axles 8 being, if desired, made to converge on lines radial to the circular track, and one or both of the wheels being loose on the axles to avoid the necessity of slipping on the rails by reason of the unequal distance traveled; but little loss of power will result, however, from the use of ordinary car axles and wheels fixed thereon.

For driving the cars I employ an endless wire cable 9, engaging by friction in a grooved seat 10, prepared for it on the outer side of the truck-frame, so that the trucks or cars 4 operate after the manner of sections of a huge spokeless wheel or pulley-rim. The trucks or cars forming sections of such pulley require no couplings and do not need to be in contact or to form a complete rim by filling the circular track. Any smaller number of cars may be effectively driven by the cable. The cars are conducted to and from the circular track as required by means of a switch 11, located within the bight of the cable 9, where it is carried over guide-sheaves 12 12$^a$ and 13 13$^a$ to and from the driving-gear. This may be of ordinary or suitable construction and is here shown consisting of a grooved drum 14, driven by an engine 15, pitman 16, crank 17, fly-wheel 18, pinion 19, and cogged rim 20, the cable being carried around a grooved tightening-drum 21, which runs in bearings in a sliding frame 22, mounted on inclined ways 23 and drawn in opposition to the pull of the cable by a cable 24 and weight 25 to maintain the requisite tension on the cable 9 in customary manner.

Suitable grooved and cone-shaped guide-sheaves 26 are arranged around the circular track to sustain and guide the cable 9 in its circuit in the absence of the trucks or cars 4 or where gaps or intervals occur between the cars. The guide-sheave 13$^a$, from which the cable 9 passes out from the cable-driving mechanism to the circular track, is arranged at the necessary height to deliver and guide the cable within reach of suitable catching arms or horns 27, which project downward and outward from the cable-seats 10 on the truck-frames, so that each truck or car as it passes from the switch 11 to the circular track 1 will properly engage the cable 9.

It is immaterial whether all the car-trucks are provided with cable-seats 10, so as to be directly driven by the cable 9. In practice ample friction will be provided by providing a small number of the cars in the circuit with this driving appliance, and these will effectually propel the others.

In Figs. VII and VIII, I have illustrated a more simple and compact apparatus designed for operation on a smaller scale, and which may be used to accomplish a like result in warehouses which do not afford sufficient room for the extended circular track shown in Figs. I, II, and III. In the illustration shown in Figs. VII and VIII a straight track 1$^a$ is employed, and the cars or trucks 4, carrying the barrels 5 of wine, spirits, or other liquors, receive a reciprocating or vibratory movement from a pitman 28, either in direct connection with the piston-rod of a suitable engine, or, preferably, connected to a crank-shaft 29, carrying a fly-wheel 30, and driven by a pulley 31 and belt or cable 32, driven by suitable power, or the pulley 31 may be made large to serve as a fly-wheel, so that the motion may be geared down, and a relatively-slow reciprocating movement may be imparted to the trucks or cars from an engine of smaller power. In this illustration, as in the other, the track-rails 1$^a$ are provided with notches or recesses 3 to impart a jarring or tremulous motion to the cars 4, running thereon, and thereby to the wine, spirits, or other liquor contained in barrels 5, loaded on said trucks or cars.

I have shown simple platform-cars provided with stout stakes or standards 33 for keeping the barrels from rolling off. These may be set removably in sockets and connected at top by chains 34, as is customary with drays, wagons, and platform-cars.

The notched or recessed rails, suitable for either a straight or circular track, and the action of the truck-wheels thereon are illustrated on a larger scale in the detail elevations, Figs. VI and VII.

In practice the desired action may be expedited by having the barrels not quite full of liquor, as I have illustrated at 5$^a$ in Fig. VI, though this is not essential to the invention. The vibratory tremulous motion imparted to the liquor as the trucks pass at a moderate speed over the notched or recessed rails greatly expedites the chemical change which occurs gradually in liquors when stored at rest and more quickly and effectually when transported on long voyages. By my invention I am enabled to accomplish within the area of a storehouse the valued results which are commonly reached by transporting liquors on very long voyages, and I am enabled to reach within the period of a few weeks or days results which require many years of time in the ordinary mode of storing liquors for aging and ripening.

It will be manifest that the tremulous or rapid vibratory action produced by my process and apparatus is diffused in the most effective manner through the entire body of liquor. This constitutes a great superiority in my invention as compared with other methods of treating liquors in bulk, and enables me to accomplish the desired result as expeditiously as it is effected on a small scale and at great expense by sprayers, stirrers, and other mechanical appliances operating by direct contact with the liquor.

In Fig. IX, I have shown a straight or smooth rail $1^d$ and an angular faced car or truck wheel 35 for running on said truck to produce the same tremulous or jarring motion which in the other illustrations is produced by notched or recessed rails.

In Figs. X and XI, I have shown corrugated wheels $35^a$ which produce a like effect.

Figs. XII and XIII represent a turn-table 36, running on ball-bearings 37, and which may be driven by an endless cable, as before described, or by pinion 38 and gear 39, as here shown. The rails 1 being formed with notches or recesses 3, as already explained, it will be apparent that stationary loaded cars or trucks $4^a$, mounted on such moving track, will derive the same jarring or tremulous motion therefrom and impart it to the liquor loaded on such trucks, as already described.

40 represents a removable abutment for retaining the train of cars stationary while the track runs beneath them.

Having thus described my invention, the following is what I claim as new therein and desire to secure by Letters Patent:

1. The process herein described of aging spirits, wines, or other liquors, which consists in subjecting the liquor in bulk to rapid mechanical vibration, producing a continuous tremulous action throughout the body of the liquor, as explained.

2. An apparatus for aging or ripening spirits, wines, or other liquors, consisting of a railway-track, one or more cars or trucks mounted thereon for carrying the liquor to be treated, the surfaces of the track and of the truck-wheels being relatively uneven, and means for communicating relative movement between the trucks and track for the purpose of producing tremulous mechanical agitation through the body of liquor, as explained.

3. An apparatus for aging spirits, wines, and other liquors, consisting of a circular or endless track, one or more trucks or cars mounted thereon, the surfaces of the track and of the truck-wheels being relatively uneven, means for storing the liquor in bulk on said cars or trucks, and means for producing relative movement between said trucks and track, all substantially as herein described, whereby a sustained tremulous action is produced through the body of the liquor, as explained.

THEODORE R. TIMBY.

Witnesses:
OCTAVIUS KNIGHT,
HERVEY S. KNIGHT.